Jan. 26, 1954 — P. C. ARNOLD — 2,667,559
METHOD OF WELDING
Filed May 4, 1951 — 2 Sheets-Sheet 1

Inventor:
Perry C. Arnold,
By Schroeder, Merriam,
Hofgren & Brady, Attys.

Jan. 26, 1954

P. C. ARNOLD 2,667,559

METHOD OF WELDING

Filed May 4, 1951

Inventor:
Perry C. Arnold
By Schroeder, Merriam,
Hofgren & Brady, Attys.

Patented Jan. 26, 1954

2,667,559

UNITED STATES PATENT OFFICE 2,667,559

METHOD OF WELDING

Perry C. Arnold, Chicago, Ill., assignor to Chicago Bridge & Iron Company, an Illinois corporation Application May 4, 1951, Serial No. 224,576

8 Claims. (Cl. 219—10)

This invention relates to a method of welding and more particularly to a method of welding involving the use of two welding heads on opposed sides of the work and the correlation of the spacing of the welding heads from each other during such welding.

The invention is an improvement on and a continuation-in-part of my copending application, Serial No. 131,223, filed December 5, 1949. It is particularly designed for use with the apparatus therein shown.

The invention is also primarily directed to the use of the so-called submerged arc welding system in which a welding electrode is submerged below the flux in predetermined spaced relationship to the plates or other material to be welded.

In using the conventional welding equipment and welding heads the welder has a choice of rod sizes, amperage, voltage and travel speed. I have found out that when using two welding heads, one on each side of the work, compensation must be made for the thickness of the plate or work to avoid burning through or otherwise overheating. Theoretically adjustment might be made by changing the amount of current, but most of the welders prefer not to make a wide variation in current and the welding apparatuses are not particularly adapted for wide variations. I have found that the current settings may be kept within the normal ranges without difficulty due to burning out providing the welding heads instead of being directly opposed to each other on the work are offset in the direction of travel along the weld, and this distance of offsetting is correlated to the thickness of the work so as to compensate for variations in thickness. I have found that the relationship may be expressed mathematically as a constant such that $D\sqrt{T}=K$ where T is the thickness of the plate in inches; D is the lead of one welding head over the other expressed in inches projected along the direction of travel in welding; and K is a constant. For practical purposes, K is approximately 2.

This means that with normal settings of the usual welding apparatus and employing a plate 1 inch thick the projected distance between the tips of the electrodes along the weld travel is approximately 2 inches, or stated more simply, that one electrode has a lead of 2 inches over the other.

In many cases of welding, as for example, in the erection of the usual liquid storage vessel, the two plates being welded at any girth seam will be of unequal thickness, the lower plate being thicker than the superimposed plate. In such cases the calculation may be made on the basis of the average, although if there is very considerable difference in the thickness it is safest to base the correlations on the thinner plate, particularly since the ends of the electrodes are likely to be closer to that plate than to the thicker plate, due to the fact that the beveling to form the V groove may be entirely in the thinner plate.

I have also found that it is frequently important to incline the electrode downwardly from the horizontal in one or the other or both of the welding electrodes. Likewise, it is frequently advantageous to incline one or both of the electrodes backwardly toward the work in the direction of travel. The angle of the tip away from the horizontal will vary from zero to fifty degrees, being normally from twenty to fifty degrees on thicker plates and from zero to twenty-five degrees on thinner plates.

The angle of inclination toward the rear will be from five to forty degrees on the thicker plates and from zero to twenty degrees on the thinner plates.

The following table gives operating data for a considerable number of plate sizes.

In this table, column 1 gives the thickness of the bottom plate; column 2 the thickness of the top plate; column 3 states the welding head conditions for the outside or inside as specified; column 4 the electrode thickness; column 5 the approximate amperage; column 6 the approximate voltage; column 7 states whether the pass is the first or second welding pass where one or more passes is employed; column 8 states the lead of one electrode over the other; column 9 the travel speed in inches per minute; column 10 gives the angle of tip from horizontal; and column 11 gives the angle of tip with radial line.

| Plate, bottom | Thickness, top | Side | Electrode thickness, inches | Approximate amperage | Approximate volts | Pass | Distance between tips, inches | Travel speed, in./min. | Angle of tip from horizontal, degrees | Angle of tip with radial Line degrees |
|---|---|---|---|---|---|---|---|---|---|---|
| 1.24 | 1.03 | Out.... | ⅛ | 650–660 | 28 | 1st.. | 1½ | 12–14 | 20–50 | 5–40 |
|  |  | In...... | ⅛ | 650–660 | 26 | 1st.. | 1½ | 12–14 | 20–50 | 5–40 |
|  |  | Out.... | ⅛ | 520–540 | 26–30 | 2nd. | 1½ | 18 | 20–50 | 5–40 |
|  |  | In...... | ⅛ | 520–540 | 26–30 | 2nd. | 1½ | 18 | 20–50 | 5–40 |
| 1.13 | 1.02 | Out.... | ⅛ | 580–600 | 24–26 | 1st.. | 1½–2 | 12–14 | 20–45 | 5–35 |
|  |  | In...... | 3⁄32 | 540–560 | 26–28 | 1st.. | 1½–2 | 12–14 | 20–45 | 5–35 |
|  |  | Out.... | ⅛ | 520–560 | 26–30 | 2nd. | 1½–2 | 24–28 | 0–25 | 0–20 |
|  |  | In...... | 3⁄32 | 480–520 | 26–30 | 2nd. | 1½–2 | 24–28 | 0–25 | 0–20 |
| 1.03 | .86 | Out.... | ⅛ | 570–580 | 24–26 | 1st.. | 2 | 13–14 | 20–45 | 5–35 |
|  |  | In...... | 3⁄32 | 540–560 | 26–28 | 1st.. | 2 | 13–14 | 20–45 | 5–35 |
|  |  | Out.... | ⅛ | 500–520 | 26–28 | 2nd. | 2 | 24–28 | 0–25 | 0–20 |
|  |  | In...... | 3⁄32 | 440–480 | 26–28 | 2nd. | 2 | 24–28 | 0–25 | 0–20 |
| .96 | .80 | Out.... | ⅛ | 570–580 | 24–26 | 1st.. | 2 | 13–14 | 20–45 | 5–35 |
|  |  | In...... | 3⁄32 | 540–560 | 26–28 | 1st.. | 2 | 13–14 | 20–45 | 5–35 |
|  |  | Out.... | ⅛ | 500–520 | 26–28 | 2nd. | 2 | 26–28 | 0–25 | 0–20 |
|  |  | In...... | 3⁄32 | 440–480 | 26–28 | 2nd. | 2 | 26–28 | 0–25 | 0–20 |
| .86 | .68 | Out.... | ⅛ | 560–580 | 24–26 | 1st.. | 2–2½ | 15–17 | 20–45 | 5–35 |
|  |  | In...... | 3⁄32 | 520–540 | 26–28 | 1st.. | 2–2½ | 15–17 | 20–45 | 5–35 |
|  |  | Out.... | ⅛ | 500–520 | 26–28 | 2nd. | 2–2½ | 26–30 | 0–25 | 0–20 |
|  |  | In...... | 3⁄32 | 440–460 | 26–28 | 2nd. | 2–2½ | 26–30 | 0–25 | 0–20 |
| .82 | .61 | Out.... | ⅛ | 560–580 | 24–26 | 1st.. | 2–2½ | 15–17 | 20–45 | 5–35 |
|  |  | In...... | 3⁄32 | 520–540 | 26–28 | 1st.. | 2–2½ | 15–17 | 20–45 | 5–35 |
|  |  | Out.... | ⅛ | 500–520 | 26–28 | 2nd. | 2–2½ | 26–30 | 0–25 | 0–20 |
|  |  | In...... | 3⁄32 | 440–460 | 26–28 | 2nd. | 2–2½ | 26–30 | 0–25 | 0–20 |
| .68 | .51 | Out.... | ⅛ | 540–560 | 26–28 | 1st.. | 2½–3 | 19–22 | 0–25 | 0–25 |
|  |  | In...... | 3⁄32 | 520–540 | 26–28 | 1st.. | 2½–3 | 19–22 | 0–25 | 0–25 |
| .64 | .47 | Out.... | ⅛ | 540–560 | 26–28 | 1st.. | 2½–3 | 20–23 | 0–25 | 0–25 |
|  |  | In...... | 3⁄32 | 520–540 | 26–28 | 1st.. | 2½–3 | 20–23 | 0–25 | 0–25 |
| .55 | .41 | Out.... | ⅛ | 540–560 | 26–28 | 1st.. | 2½–3 | 23–25 | 0–25 | 0–25 |
|  |  | In...... | 3⁄32 | 520–540 | 26–28 | 1st.. | 2½–3 | 23–25 | 0–25 | 0–25 |
| .51 | .33 | Out.... | ⅛ | 540–560 | 26–28 | 1st.. | 2½–3 | 25–27 | 0–25 | 0–25 |
|  |  | In...... | 3⁄32 | 520–540 | 26–28 | 1st.. | 2½–3 | 25–27 | 0–25 | 0–25 |
| .47 | .31 | Out.... | ⅛ | 500–520 | 26–28 | 1st.. | 3–3½ | 27–30 | 0–25 | 0–25 |
|  |  | In...... | 3⁄32 | 480–500 | 26–28 | 1st.. | 3–3½ | 27–30 | 0–25 | 0–25 |
| .41 | .27 | Out.... | ⅛ | 480–500 | 27–29 | 1st.. | 4–4½ | 30–33 | 0–25 | 0–25 |
|  |  | In...... | 3⁄32 | 460–480 | 27–29 | 1st.. | 4–4½ | 30–33 | 0–25 | 0–25 |
| .33 | .25 | Out.... | ⅛ | 440–450 | 28–30 | 1st.. | 4–5 | 33–36 | 0–25 | 0–25 |
|  |  | In...... | 3⁄32 | 440–450 | 28–30 | 1st.. | 4–5 | 33–36 | 0–25 | 0–25 |
| .27 | .25 | Out.... | 3⁄32 | 440–460 | 28–30 | 1st.. | 4–5 | 38–42 | 0–25 | 0–25 |
|  |  | In...... | 3⁄32 | 420–440 | 28–30 | 1st.. | 4–5 | 38–42 | 0–25 | 0–25 |

It will be noted that the travel speed is likewise in constant ratio to the lead of one electrode over the other for any given pass. In other words, the travel speed in inches per minute is approximately 7 to 9 times the lead expressed in inches on the first pass and 12 to 14 times on the second pass.

The drawings indicate diagrammatically the angle of approach of the electrodes.

Figure 1:
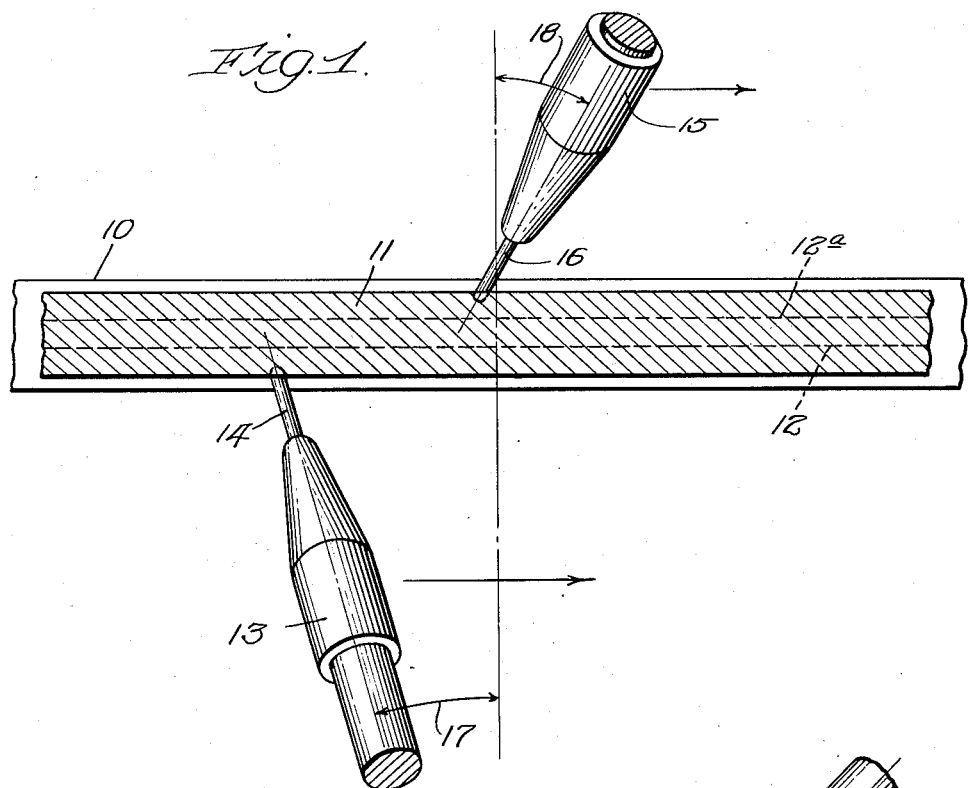
Figure 1 is a plan view showinig the lead of one electrode over the other and the rearward inclination of the tip.

In Figure 1, 10 indicates the lower plate; 11 the upper plate; 12 the groove within which weld metal is to be deposited; 13, one welding head with an electrode 14; 15, the other welding head with an electrode 16. The angles at 17 and 18 indicate rearward inclination of the electrodes.

Figure 2:
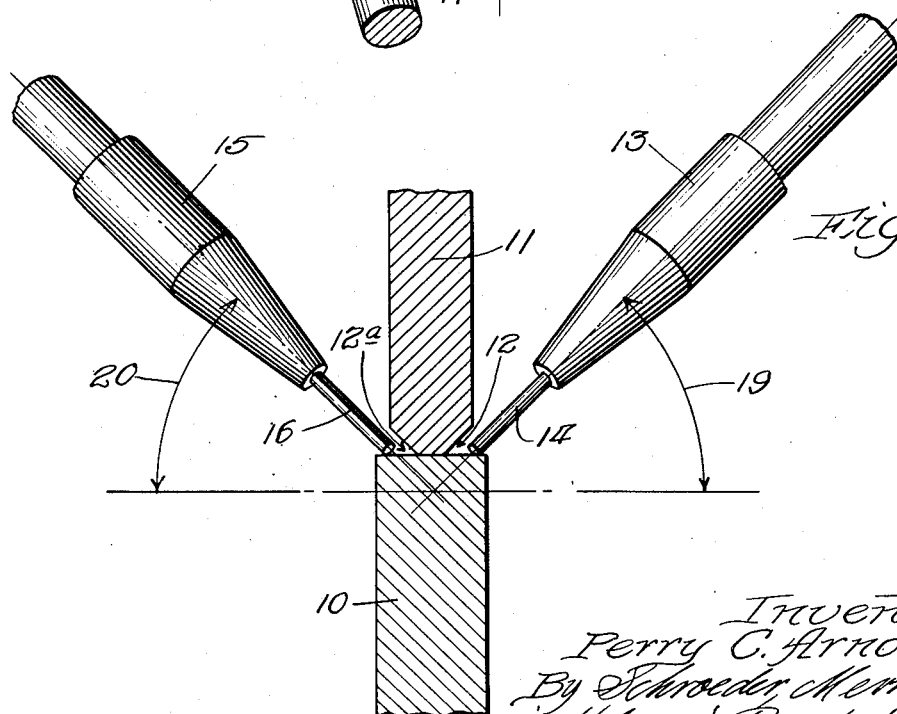
Figure 2 is an elevation view showing the inclination of the tip from the horizontal.

In Figure 2, grooves 12 and 12a are illustrated and 19 and 20 indicate the angles of declination of the tip from the horizontal.

Figure 3:
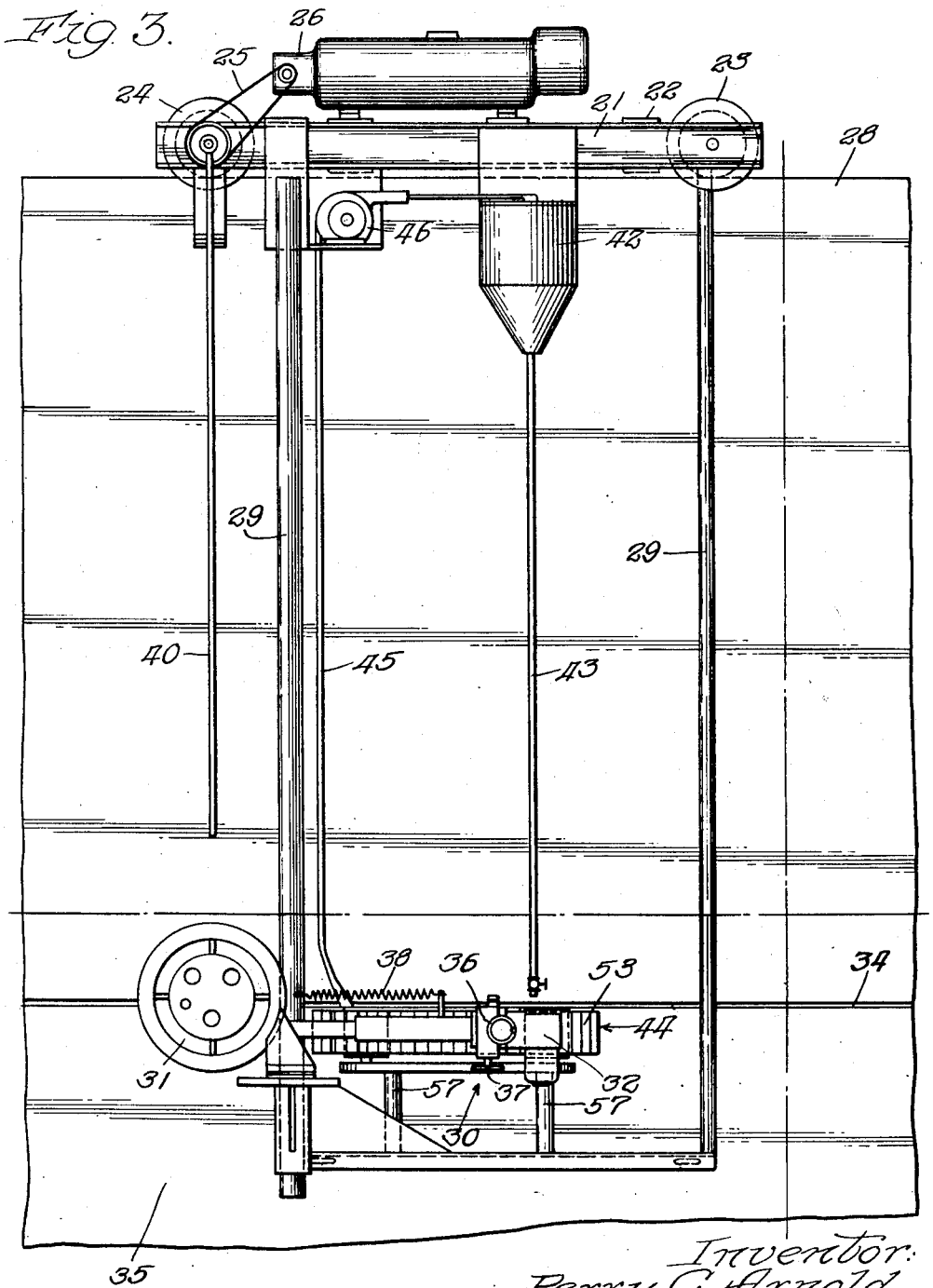
Figure 3 is a front plan view of a welding apparatus as illustrated in applicant's copending application Serial No. 131,223, filed December 5, 1949, for carrying the welding electrodes along a horizontal joint to perform the welding as herein specified.

The welding apparatus illustrated in Figure 3 is more clearly described in applicant's copending application referred to above. In general, frame members 21 are provided with a wheel 23 and a second wheel 24 both rotatably mounted between the frame members 21. Wheel 24 is adapted to be driven by means of a chain 25 connected to a variable speed motor 26. The wheels are each provided with a central groove adapted to receive the upper edge of a plate 28 and to carry the carriage therealong.

A framework 29 is suspended vertically from the carriage and is provided at its lower end with a welding apparatus 30. Two such frames 29 and apparatus 30 are provided, one on each side of the plates forming the joint 34. The welding apparatus 30 carries a drum 31 adapted to hold a coil of electrode wire and motor means 32 adapted to feed the electrode from the coil to a welding head directed against the joint 34 existing between the plate 28 and a lower plate 35. The welding apparatus is that known as "Unionmelt" and the motor means is provided with means regulating the rate of feed of the electrode in response to variations in voltage across the welding zone.

Manually operable handles 36 and 37 may be used to move the welding head inwardly, outwardly and vertically to locate the welding head the correct distance and in correct alignment with the joint 34. Spring 38 is connected to the frame and to the welding apparatus to urge the latter against the plate.

Clutch means operated by the handle 40 is provided to clutch the driving motor 26 to the wheel 24 to propel the carriage, and hence the apparatus, against the joint. The driving motor 26 may be adjusted to give a speed along the weld of from 10 to 60 inches per minute.

Flux supplied from a hopper 42 by a pipe 43 is conducted to a flux support 44 immediately ahead of the arc. Suction pipe 45 has its lower end closely adjacent the support behind the arc to pick up unfused flux material from the support through the medium of a pump 46. The flux support 44 is supported upon short posts 57, and in the particular embodiment illustrated has a caterpillar type tread 53.

The foregoing detailed description is given for clearness of understanding only and no unnecessary limitations should be understood there-from as modifications will be obvious to those skilled in the art.

I claim:

1. In the process of submerged arc electric welding of a generally horizontal joint between upright plates, the method which comprises: mounting a carriage on the upper plates to carry a welding head along the joint, correlating the rate of travel of the carriage to the fusion of an electrode carried at the joint by the carriage to deposit a weld bead substantially larger than the welding electrode, directing the electrode downwardly and rearwardly toward the joint to permit expanding gases to carry metal being deposited toward previously deposited metal and upwardly in the joint into freezing contact with the upper plate, and fusing the so deposited weld bead by such directing to both the upper and lower plates with the bead having a root width substantially smaller than its outer width to provide cooling of the bead from the root of the joint outwardly avoiding faults in the deposited metal.

2. The method of claim 1 wherein a welding head is employed on each side of the seam and the heads are moved in concert along the seam with one head leading the other by an amount such that the lead in inches multiplied by the square root of the thickness of the work in inches is approximately a constant.

3. In the process of submerged arc electric welding of a generally horizontal joint between upright plates, the method which comprises: directing a welding electrode to the joint to deposit weld metal therein, striking an arc between the electrode and plates at the joint, moving the electrode along the joint while feeding same toward the joint to provide additional metal for fusion to the plates, correlating the rate of moving the electrode to the fusion thereof to deposit a weld bead substantially larger than the welding electrode and of a size to completely weld one side of a joint in plates up to about one-half inch thick, directing the electrode rearwardly and downwardly toward the joint to permit expanding gases to wash the deposited weld metal rearwardly along the seam so that the gases from the fused flux carry the metal upwardly and freeze the metal to both upper and lower plates in a weld bead having a width at least equal to its depth.

4. In the process of submerged arc electric welding of a generally horizontal joint between upright plates, the method which comprises: feeding a welding electrode toward the joint, striking an arc between the plates and the electrode along the joint while continuing feeding the same to provide additional weld metal for fusion to the plates, correlating the rate of moving the electrode to the fusion thereof to deposit a weld bead substantially larger than the welding electrode, and directing the electrode to the joint downwardly and rearwardly to permit the expanding gases to wash deposited weld metal toward previously deposited metal and build up a weld bead fused to each plate and having a width at least equal to its depth whereby the bead cools from the inside progressively outwardly.

5. The method as set forth in claim 4 in which the electrode is directed downwardly from horizontal not substantially more than 45° for thicknesses of work less than one inch.

6. The method as set forth in claim 4 in which the electrode is directed downwardly from horizontal not less than 20° nor substantially more than 50° for thicknesses of work more than one inch.

7. The method as set forth in claim 4 in which the backward inclination of the electrode is not substantially more than 35° to a line normal to the work for thicknesses of work less than one inch.

8. The method as set forth in claim 4 in which the backward inclination of the electrode is not less than 5° nor more than 40° to a line normal to the work for thicknesses of work more than one inch.

PERRY C. ARNOLD.

References Cited in the file of this patent

UNITED STATES PATENTS

| Number | Name | Date |
| --- | --- | --- |
| 1,091,479 | Bucknam | Mar. 31, 1914 |
| 2,401,722 | Clapp et al. | June 11, 1946 |